United States Patent
Maurel

(10) Patent No.: US 7,270,301 B2
(45) Date of Patent: Sep. 18, 2007

(54) SURFACE OPTICAL REFLECTOR, FOR SPACE CRAFT SUCH AS A GEOSTATIONARY SATELLITE

(75) Inventor: Gilles Maurel, Le Cannet (FR)

(73) Assignee: Thales, Neuilly sur Seine (FR)

( * ) Notice: Subject to any disclaimer, the term of this patent is extended or adjusted under 35 U.S.C. 154(b) by 92 days.

(21) Appl. No.: 10/491,633

(22) PCT Filed: Sep. 30, 2002

(86) PCT No.: PCT/FR02/03325

§ 371 (c)(1),
(2), (4) Date: Apr. 2, 2004

(87) PCT Pub. No.: WO03/042038

PCT Pub. Date: May 22, 2003

(65) Prior Publication Data

US 2005/0001101 A1  Jan. 6, 2005

(30) Foreign Application Priority Data

Oct. 8, 2001  (FR)  ................................ 01 12909

(51) Int. Cl.
  *B64G 1/58*  (2006.01)
(52) U.S. Cl. ................ 244/171.7; 244/158.1
(58) Field of Classification Search ............ 244/158 R, 244/163, 171.7, 171
See application file for complete search history.

(56) References Cited

U.S. PATENT DOCUMENTS 3,671,286 A   6/1972  Fischell
5,400,986 A   3/1995  Amore
5,888,618 A * 3/1999  Martin ..................... 428/156
6,204,903 B1* 3/2001  Hayashi et al. ............ 349/113
6,440,334 B2* 8/2002  Currens et al. ............ 264/1.34
6,827,456 B2* 12/2004 Parker et al. .............. 362/629

FOREIGN PATENT DOCUMENTS

EP   0 930 231 A2   7/1999

OTHER PUBLICATIONS http://www.ce-mag.com/archive/01/Spring/Rosner.html, Conductive materials for ESD Applications.*
http://scifun.chem.wisc.edu/chemweek/POLYMERS/Polymers.html, Chemical of the week.*
http://www.zeusinc.com/pdf/Zeus_Low_Temp.pdf, Low Temperature Properties of Polymers.*
http://en.wikipedia.org/wiki/Teflon, Teflon.*

* cited by examiner

Primary Examiner—Timothy D. Collins
(74) Attorney, Agent, or Firm—Sughrue Mion Pllc.

(57) ABSTRACT

Optical surface reflector, for a spacecraft such as a geostationary satellite.

The exterior surface (10) of the reflector comprises a plurality of facets (14) inclined to each other and to the interior surface (12) of the reflector. The facets (14) advantageously form a pyramid with a square base in which the angle at the apex is equal to 90°. However, other arrangements are possible without departing from the scope of the invention. The invention increases radiative capacity without significantly increasing mass and overall size.

13 Claims, 2 Drawing Sheets

SURFACE OPTICAL REFLECTOR, FOR SPACE CRAFT SUCH AS A GEOSTATIONARY SATELLITE

TECHNICAL FIELD

The invention relates to an optical surface reflector adapted to be mounted on a spacecraft such as a geostationary satellite for thermal control thereof.

PRIOR ART

To assure the thermal control of satellites, and in particular geostationary satellites, it is common practice to equip them with optical surface reflectors (OSR) made from glass coated with silver on the side facing the satellite.

Optical surface reflectors are panels, usually plane panels, transparent to infrared radiation, with the surface facing the satellite metallized. They are intended to reflect almost all incident solar radiation and to have as high as possible a radiative capacity, especially in the infrared band. In other words, optical surface reflectors evacuate the heat produced by some of the onboard equipment of the satellite to guarantee thermal control thereof.

In some spacecraft, such as geostationary satellites and satellites in low heliosynchronous orbits, achieving satisfactory thermal control imposes the use of optical surface reflectors having a high radiative capacity and consequently a large surface area.

In the current state of the art, the only known solution for achieving this result consists in providing the satellites with deployable reflectors formed of a plurality of articulated panels.

However, this solution has significant drawbacks. Thus, one particular consequence of using deployable reflectors is a significant increase in the mass and the volume of the satellites. What is more, it results in the presence of mechanisms whose operation in a vacuum constitutes a risk in terms of reliability.

Also, it is known in the art to increase the thermal emissivity of black bodies by making their wall in the form of a pyramidal array consisting of the juxtaposition of a large number of small triangular surfaces inclined relative to the plane of said wall. However, in this situation there is no constraint associated with the need to absorb none of the incident solar radiation.

Finally, the document EP-A-0 930 231 describes an interface between a component emitting heat and a support plate on a satellite. The interface comprises juxtaposed metal strips each of which originally has pyramidal or hemispherical protuberances. Fixing the component to the support plate crushes the protuberances. This achieves improved surface contact between the parts and consequently improved evacuation of heat toward the support plate by conduction.

SUMMARY OF THE INVENTION

The invention is an optical surface reflector for a spacecraft, whose novel design increases the radiative capacity of the spacecraft without significantly changing the coefficient of absorption of sunlight, minimizing the increase in mass and volume, and avoiding the addition of mechanisms liable to impact on the reliability of the radiator.

In accordance with the invention, this result is achieved by an optical surface adapted to form an exterior wall of a spacecraft, said reflector comprising an exterior surface adapted to face out into space and an interior surface adapted to face the spacecraft and being characterized in that the exterior surface comprises a plurality of facets inclined to each other and to said interior surface.

Note that the term "facets" must be understood throughout this text as designating distinct surface areas of finite dimensions, regardless of their size. Thus the scale of the dimensions of the facets may be millimetric, decimetric or any intermediate scale without departing from the scope of the invention.

Producing the exterior surface of the optical reflector in the form of inclined facets increases the radiative surface area by 12% to 15% without significantly increasing the mass and the volume of the reflector. Moreover, this arrangement also avoids using deployment mechanisms.

The angles between adjacent facets are chosen as a function of the angles of incidence at which solar rays are liable to impinge on the reflector, i.e. as a function of the intended orientation of said reflector on the satellite, in order for the solar rays to be reflected only once by the facets of the reflectors.

Each of the facets advantageously comprises a layer of material transparent to infrared radiation and having an interior face adapted to face the spacecraft and covered with a metallization layer.

In this case, each of the facets preferably comprises a metallization layer chosen from the group comprising silver and aluminum.

Each of the facets optionally further comprises a layer of material transparent to the solar spectrum, such as glass.

The facets are fixed to a substrate serving as an interior support and made from a material chosen from the group comprising glass and polytetrafluoroethylene.

To facilitate their fabrication, the facets are preferably substantially plane.

The facets advantageously form projecting members with a polygonal base and disposed in a regular array on said exterior surface.

In this case, the shape of the polygonal base of the projecting members is chosen from the group comprising equilateral triangles, squares, rectangles, lozenges and regular hexagons.

In the preferred embodiment of the invention, the projecting members are pyramids with a square base.

In the optimum situation in which the orientation of the reflector is such that solar rays are liable to impinge on the reflector at an angle of incidence from 45° to 90° relative to the local normal to the interior surface of the reflector, the angle at the apex of the pyramids is 90°.

In the case of a geostationary satellite equipped with a reflector whose orientation is such that solar rays are liable to impinge on the reflector at an angle of incidence from 60° to 90° relative to the local normal to the interior surface of the reflector, the angle at the apex of the pyramids is 60°.

Finally, in the situation where the orientation of the reflector is such that solar rays are liable to impinge on the reflector at an angle of incidence from 30° to 90° relative to the local normal to the interior surface of the reflector, the angle at the apex of the pyramids is 120°.

BRIEF DESCRIPTION OF THE DRAWINGS

Preferred embodiments of the invention are described next by way of illustrative and non-limiting example and with reference to the appended drawings, in which.

DETAILED DESCRIPTION OF PREFERRED EMBODIMENTS OF THE INVENTION

An optical surface reflector according to the invention constitutes a rigid panel adapted to form an exterior wall of a spacecraft such as a geostationary satellite or a satellite in low heliosynchronous orbit.

Figure 1:
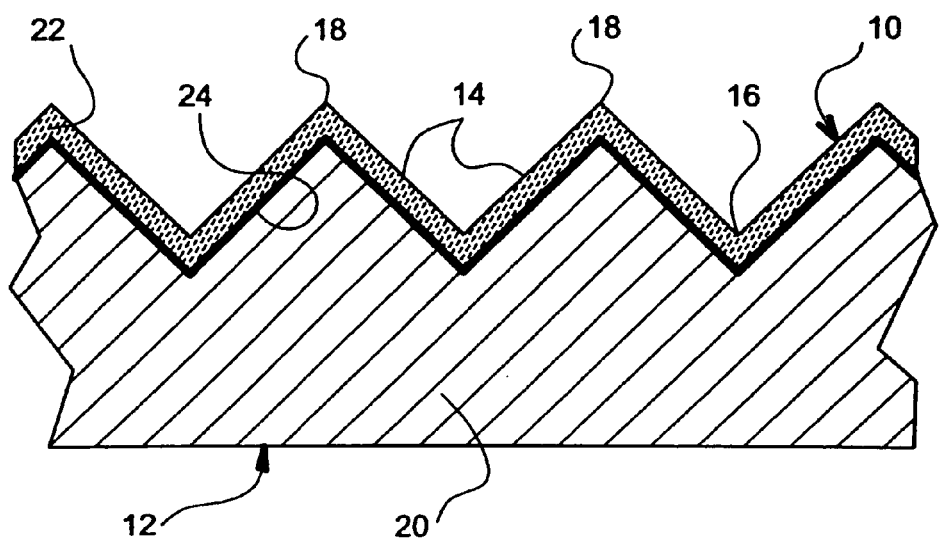
FIG. 1 is a diagrammatic view in cross section representing an optical surface reflector according to the invention.

As shown very diagrammatically in FIG. 1, a panel of this kind therefore comprises an exterior surface 10 adapted to face out into space and in direct contact with the vacuum of space and an interior surface 12 adapted to face the spacecraft that is equipped with said reflector.

The functions of the optical surface reflector of the invention are, firstly, to assure maximum thermal emissivity from the interior of the satellite toward the exterior, in particular in the infrared band of radiation, and, secondly, to reflect most of the incident sunlight that impinges on the exterior surface 10.

To improve the thermal emissivity without using deployable reflectors, the invention proposes to make the exterior surface 10 in the form of a plurality of juxtaposed facets 14.

In the preferred embodiments of the invention depicted in the figures, the optical reflector has a substantially plane general configuration. In other words, the interior surface 12 of the reflector is plane and its exterior surface 10, taken as a whole, i.e. at the level of the base 16 of each of the facets 14, is also plane. Note that the invention is not limited to this arrangement and also covers the situation in which the optical reflector has some curvature in one or two directions. Thus in the following description the normal to the plane of the reflector or to the interior surface thereof is the local normal to that plane.

Moreover, the preferred embodiments of the invention depicted in the figures also have the common feature that the facets 14 are all plane and oriented obliquely relative to the exterior surface 10 of the reflector taken as a whole. However, the invention is not limited to this arrangement and also covers situations in which at least some of the facets 14 are curved and some facets are oriented parallel to the exterior surface 10 of the reflector taken as a whole.

Figure 2:
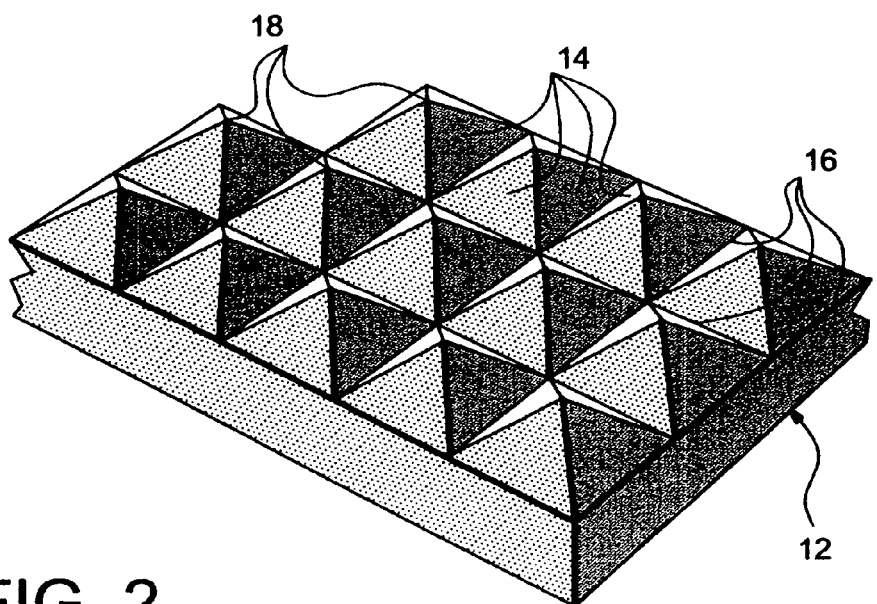
FIG. 2 is a perspective view from above depicting a first embodiment of the invention in which the exterior surface of the reflector is formed of juxtaposed pyramids with square bases.
Figure 3:
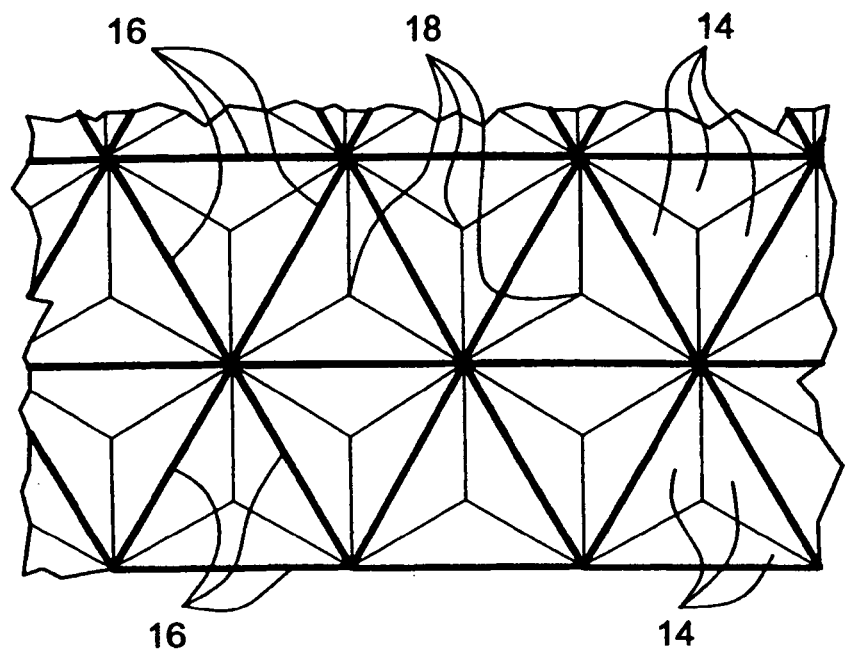
FIG. 3 is a view from above depicting a second embodiment of the invention in which the exterior surface of the reflector is formed of juxtaposed pyramids with triangular bases.
Figure 4:
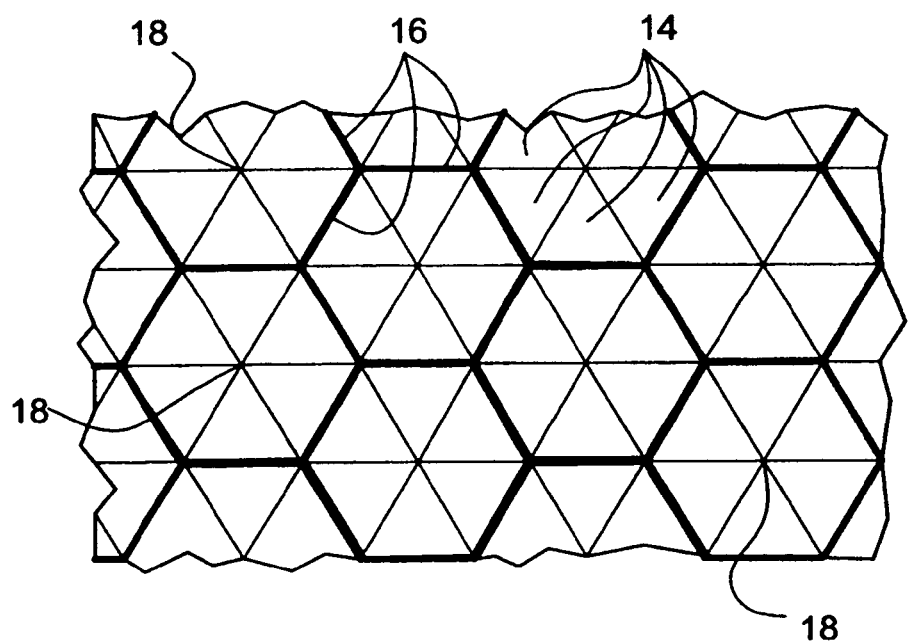
FIG. 4 is a view comparable to FIG. 3 and depicting a third embodiment of the invention in which the exterior surface of the reflector is formed of juxtaposed pyramids with hexagonal bases.

As shown in more detail in FIGS. 2 to 4, the facets 14 advantageously take the form of isosceles triangles whose bases 16 are common to two adjacent facets and whose apexes 18 are common to four adjacent facets 14 (FIG. 2), three adjacent facets 14 (FIG. 3), or six adjacent facets 14 (FIG. 4).

The facets 14 therefore form on the exterior surface 10 of the reflector projecting members with polygonal bases disposed in a regular array on said exterior surface.

In FIG. 2, the projecting members have a square base and each of them is formed by the juxtaposition of four triangular facets 14.

In FIG. 3, the projecting members have a base in the shape of an equilateral triangle and each of them is formed by the juxtaposition of three triangular facets 14.

Finally, in FIG. 4, the projecting members have a base of hexagonal shape and each of them is formed by the juxtaposition of six triangular facets 14.

The scale of the dimensions of the projecting members formed by the facets 14 may be millimetric or decimetric, it being understood that all intermediate scales are equally possible. The lower limit is determined to avoid any risk of diffraction of sunlight.

Note that the bases 16 and the apexes 18 may also consist of parallel lines, generally straight lines. In this case, the facets 14 are no longer triangular but take the form of flat strips inclined relative to the exterior surface 10 of the reflector, taken as a whole, to form V-section projecting members.

As shown in more detail in FIG. 1, a solar surface reflector panel according to the invention comprises a support structure 20 to which the individual solar surface reflectors are stuck. The reflectors are formed on their exterior faces (facets 14) of a layer of material 22 transparent to solar radiation, such as glass, and on their interior faces of a reflective metallization layer 24. If the dimensions allow, the metallization layer 24 and the transparent material layer 22 are deposited by evaporation in a vacuum.

Solar radiation is therefore returned to the exterior without causing heating other than that associated with transmission losses in the glass and reflection losses of the metallic layer. Heat from the satellite is transmitted by thermal conduction from the interior surface 12 of the reflector to the support structure 20, and thence to the exterior surface 10, from which it may be radiated into space in accordance with Lambert's laws.

The support structure 20 may be made from any material having the required mechanical and optical characteristics. This material may in particular be a metal, a metal alloy, or a composite material.

The transparent material layer 22 is usually glass, deposited on the metallization layer 24. The transparent material layer 22 may also be dispensed with.

The support structure 20 is generally made of glass to minimize the mechanical stresses between it and the transparent material layer 22 in the event of temperature variations.

If the transparent material layer 22 is dispensed with, the support structure 20 may be made from some other material, such as polytetrafluoroethylene.

The metallization layers 24 are made, for example, of silver, aluminum or any other metal or metallic alloy having a good coefficient of reflection in the solar spectrum.

Without departing from the scope of the invention, the metallization layers 24 may be deposited on the transparent material layers 22 by any means known to the person skilled in the art, such as deposition by evaporation in a vacuum.

In the preferred embodiment of the invention depicted diagrammatically in FIGS. 1 and 2, the projecting members formed by the facets 14 are pyramids with a square base whose angle at the apex, in section in a median plane parallel to the bases 16 and passing through the apex 18, is substantially equal to 90°. This arrangement is adapted to the situation in which the solar rays impinge on the reflector at an angle of incidence from 45° to 90° relative to the local normal to the interior surface 12 of the reflector.

In the case of a geostationary satellite, where solar rays impinge on the reflector at an angle of incidence from 60° to 90°, the angles at the apex of the square-based pyramids formed by the facets 14 may be more acute and equal to 60°.

On the contrary, if solar rays impinge on the reflector at an angle of incidence from 30° to 90°, the angles at the apex of the square-base pyramids formed by the facets 14 are more obtuse and equal to 120°.

Compared to a prior art optical reflector having a plane exterior surface, a reflector as described above increases by a factor of 2.82 the effective surface area of the reflector exposed to cold vacuum. On the other hand, thermal coupling is created between the facets 14. Accordingly, the thermal emissivity of the reflector reaches values close to 1, i.e. from 0.95 to 0.99, without the volume and the mass of said reflector being significantly increased.

Moreover, the surface area exposed to sunlight is not significantly increased relative to a prior art plane optical reflector. This surface area therefore remains marginal and the coefficient of absorption of the reflector is not significantly increased relative to the prior art. Moreover, in the case of sunlight impinging on the reflectors placed on the faces at the equinox of the satellite, the paths in the glass are shorter and absorption is therefore reduced.

Without departing from the scope of the invention, instead of having a square base, the projecting pyramids formed by the facets 14 can instead have a base in the shape of an equilateral triangle or in the shape of a regular hexagon, as represented as if seen from above in FIGS. 3 and 4. The shape of the bases of the projecting members may also be that of a lozenge or an isosceles triangle without departing from the scope of the invention.

The embodiments just described with reference to FIGS. 1 to 4 optimize the radiative capacities of the radiator. Alternatively, the pyramidal projecting members may be separated by facets 14 parallel to the interior surface 12 of the reflector. The radiative capacities are then lower than in the figures but remain very much higher than those of prior art reflectors.

Finally, note that the reflector of the invention may integrate exterior components such as heat pipes. It then has a hybrid structure different from that shown in the figures. An increase of the radiative surface area relative to the prior art from 12% to 15% is also possible in this case.

The invention claimed is:

1. An optical surface reflector forming an exterior wall of a spacecraft, said reflector comprising:
    an exterior surface (10) that faces out into space; and
    an interior surface (12) that faces the spacecraft,
    wherein, the exterior surface (10) comprises a plurality of facets (14) inclined to each other and to said interior surface (12).

2. The optical surface reflector according to claim 1, wherein the facets (14) are at angles to each other such that substantially all incident solar rays are reflected only once by said facets (14) in an intended orientation of said reflector relative to said incident solar rays.

3. The optical surface reflector according to claim 1, wherein each of the facets (14) comprises a layer (22) of material transparent to solar radiation and having an interior face adapted to face the spacecraft and covered with a metallization layer (24).

4. The optical surface reflector according to claim 1, wherein each of the facets (14) comprises a metallization layer (24) chosen from the group consisting of silver and aluminum.

5. The optical surface reflector according to claim 4, wherein each of the facets (14) further comprises a layer (22) of material transparent to the solar spectrum.

6. The optical surface reflector according to claim 1, wherein the facets are fixed to a substrate serving as an interior support (20) and the substrate is made from a material chosen from the group consisting of glass and polytetrafluoroethylene.

7. The optical surface reflector according to claim 1, wherein lowermost edges of each of the facets (14) are substantially in plane.

8. The optical surface reflector according to claim 1, wherein the facets (14) form projecting members with a polygonal base and are disposed in a regular array on said exterior surface.

9. The optical surface reflector according to claim 8, wherein the shape of the polygonal base of the projecting members is chosen from the group consisting of equilateral triangles, squares, rectangles, lozenges and regular hexagons.

10. The optical surface reflector according to claim 9, wherein the projecting members are pyramids with a square base.

11. The optical surface reflector according to claim 10, wherein the angle at the apex of the pyramids is 90° if solar rays are liable to impinge on the reflector at an angle of incidence from 45° to 90° relative to the local normal to the interior surface (12) of the reflector.

12. The optical surface reflector according to claim 10, wherein the angle at the apex of the pyramids is 60° if solar rays are liable to impinge on the reflector at an angle of incidence from 60° to 90° relative to the local normal to the interior surface (12) of the reflector.

13. The optical surface reflector according to claim 10, wherein the angle at the apex of the pyramids is 120° if solar rays are liable to impinge on the reflector at an angle of incidence from 30° to 90° relative to the local normal to the interior surface (12) of the reflector.

* * * * *